United States Patent [19]
Barker

[11] Patent Number: 5,744,264
[45] Date of Patent: Apr. 28, 1998

[54] LITHIUM ION ELECTROCHEMICAL CELL

[75] Inventor: Jeremy Barker, Henderson, Nev.

[73] Assignee: Valence Technology, Inc., Henderson, Nev.

[21] Appl. No.: 665,105

[22] Filed: Jun. 13, 1996

[51] Int. Cl.$^6$ .................... H01M 10/40; H01M 4/50; H01M 4/52

[52] U.S. Cl. .................... 429/218; 429/223; 429/224; 429/60

[58] Field of Search .................... 429/194, 224, 429/223, 218, 60; 423/448

[56] References Cited

U.S. PATENT DOCUMENTS

| | | | |
|---|---|---|---|
| 5,344,724 | 9/1994 | Ozaki et al. | 429/218 X |
| 5,352,548 | 10/1994 | Fujimoto et al. | 429/218 X |

FOREIGN PATENT DOCUMENTS

| | | |
|---|---|---|
| 0474183 | 3/1992 | European Pat. Off. |

OTHER PUBLICATIONS

J. Electrochem. Soc., vol. 142, No. 9, Sep. 1995, Charge–Discharge Mechanism of Graphitized Mesocarbon Microbeads, pp. 3048–3051.

J. Electrochem. Soc., vol. 142, No. 2, Feb. 1995, Structural and Kinetic Characterization of Lithium Intercalation into Carbon Anodes for Secondary Lithium Batteries, pp. 371–378.

J. Electrochem. Soc., vol. 142, No. 4, Apr. 1995, Charge–Discharge Characterstics of the Mesocarbon Microbeads Heat–Treated at Different Temperatures, pp. 1041–1046.

Journal of Power Sources, 51 (1994), Lithium–Ion Rechargeable Batteries, pp. 79–104 No Month.

*Primary Examiner*—Anthony Skapars
*Attorney, Agent, or Firm*—Robert Krebs

[57] ABSTRACT

Non-aqueous solid electrochemical cells with improved performance can be fabricated by employing intercalation based carbon anodes comprising graphitized microbead carbon particles. When employed in a lithium electrochemical cell sufficient cathode material is employed to intercalate the anode active material to attain a specific electrode capacity of greater than about 372 mAh/g. The electrochemical cell has a cycle life of greater than 200 cycles, and has a first cycle capacity loss of only about 10% to 15%.

25 Claims, 4 Drawing Sheets

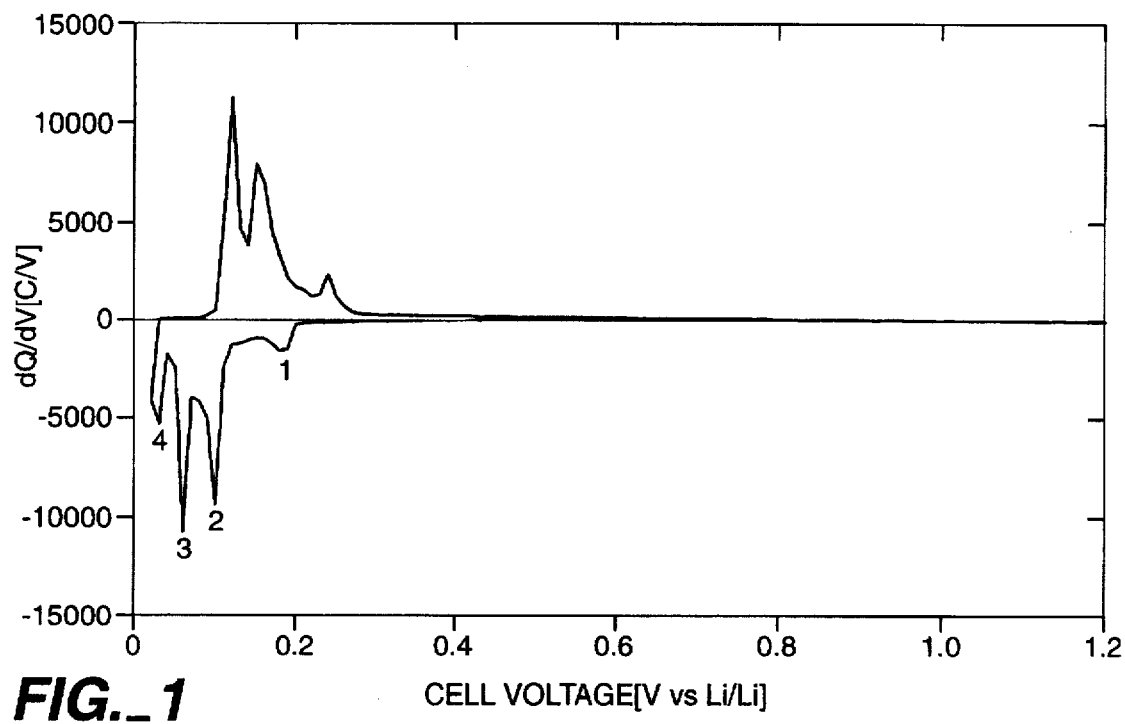
FIG._1
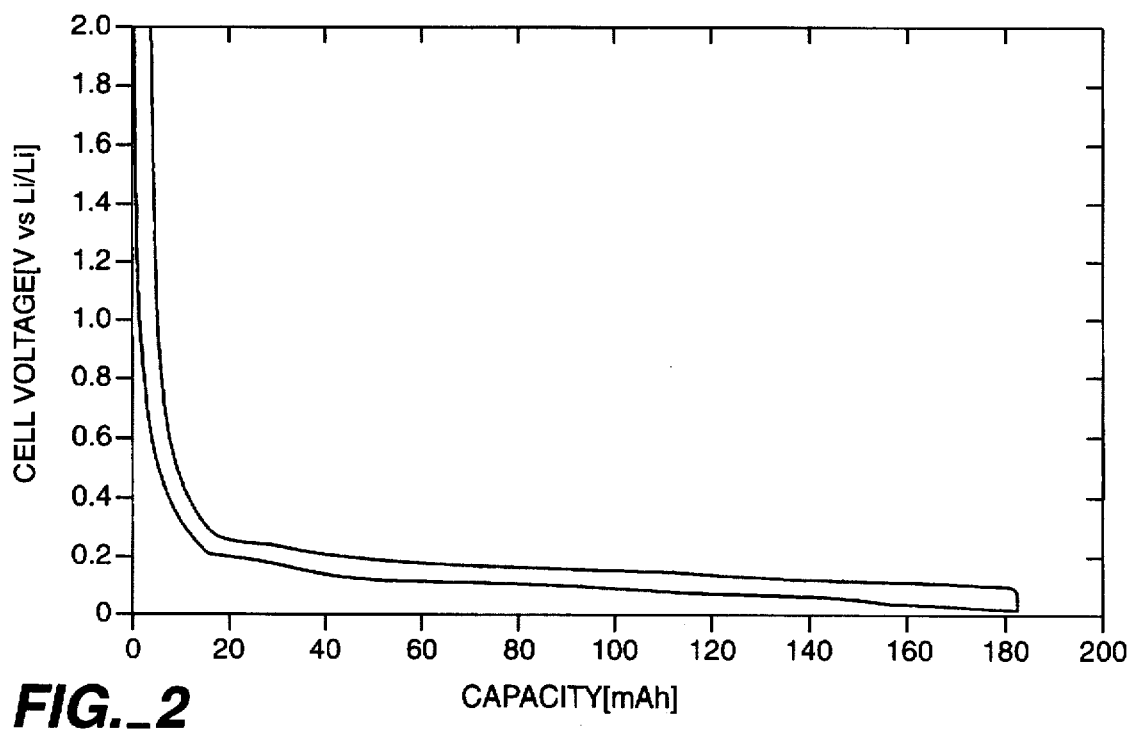
FIG._2

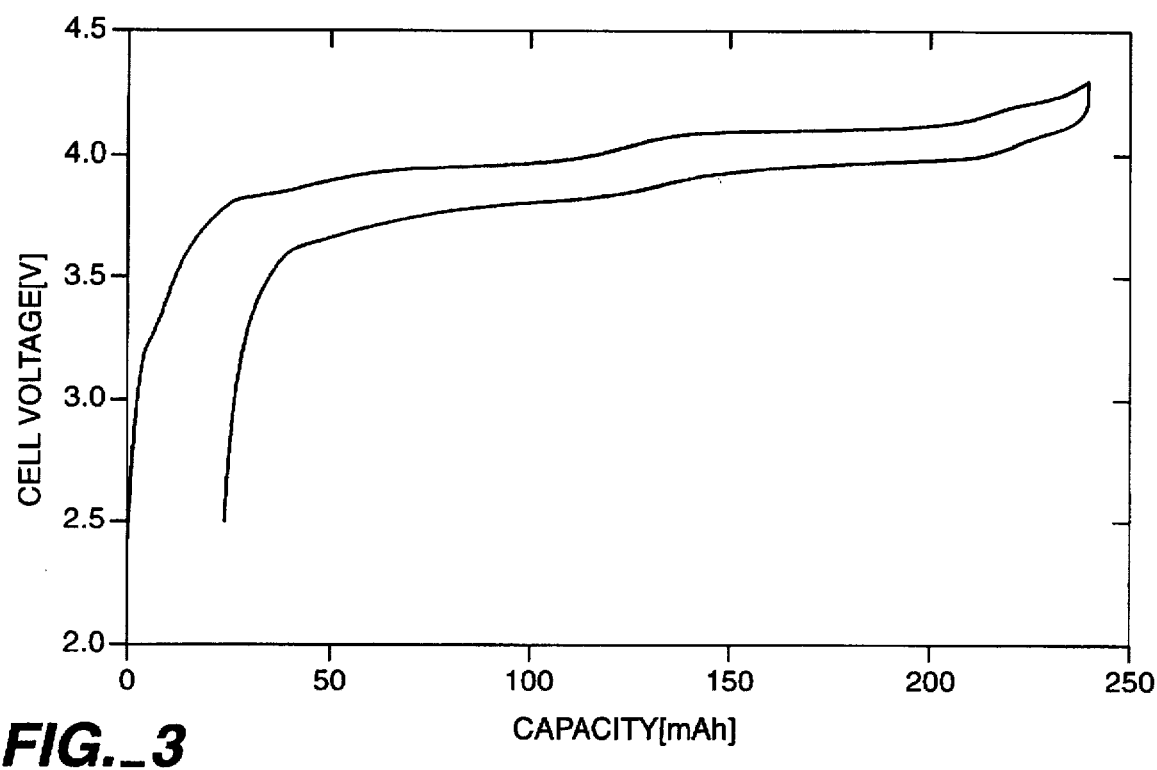
FIG._3
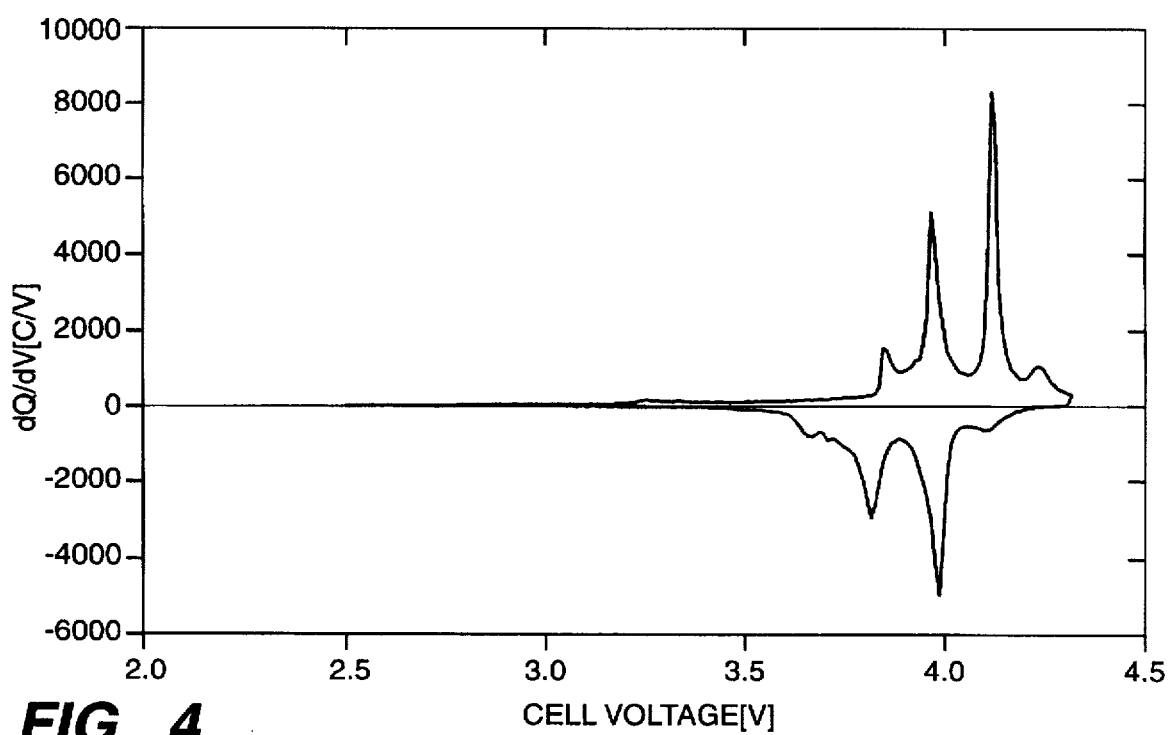
FIG._4

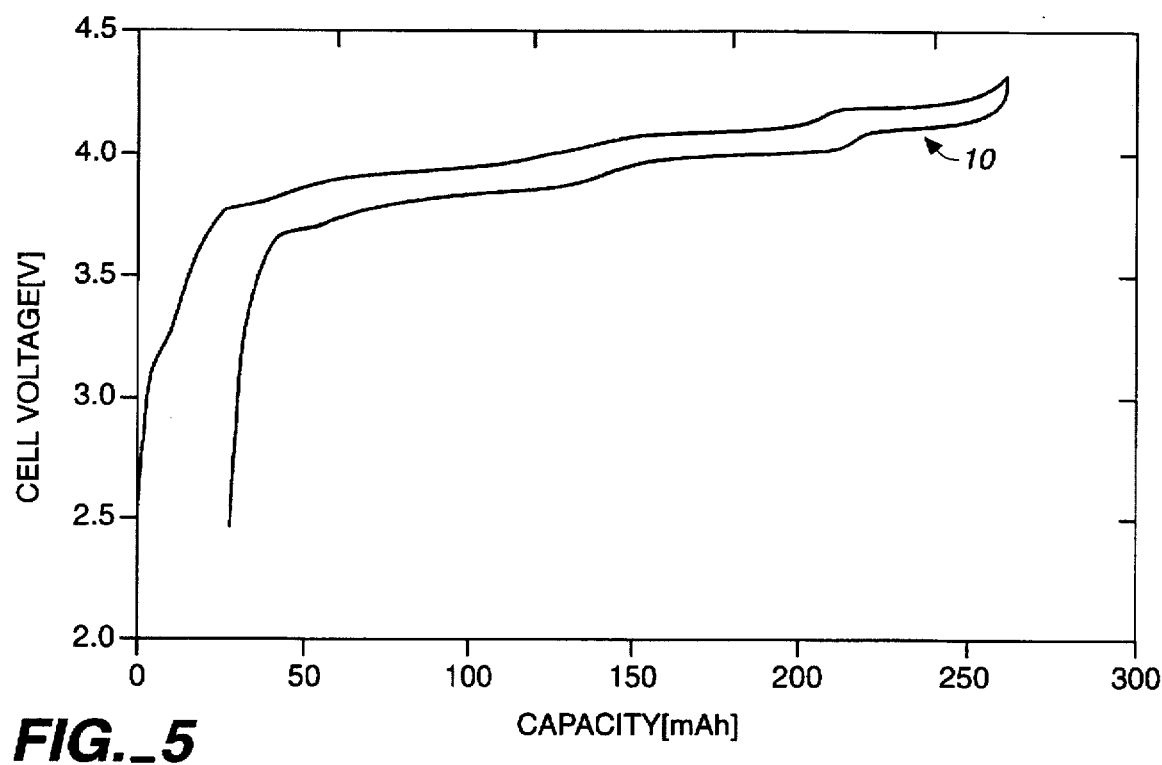
FIG._5
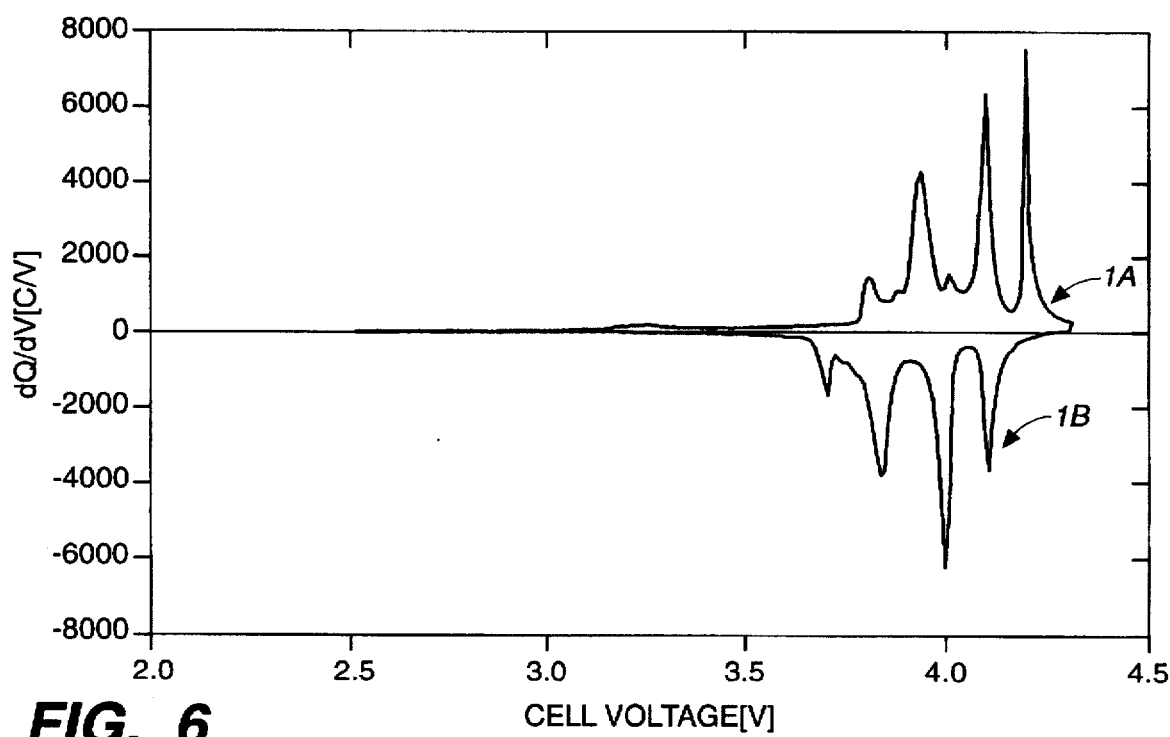
FIG._6

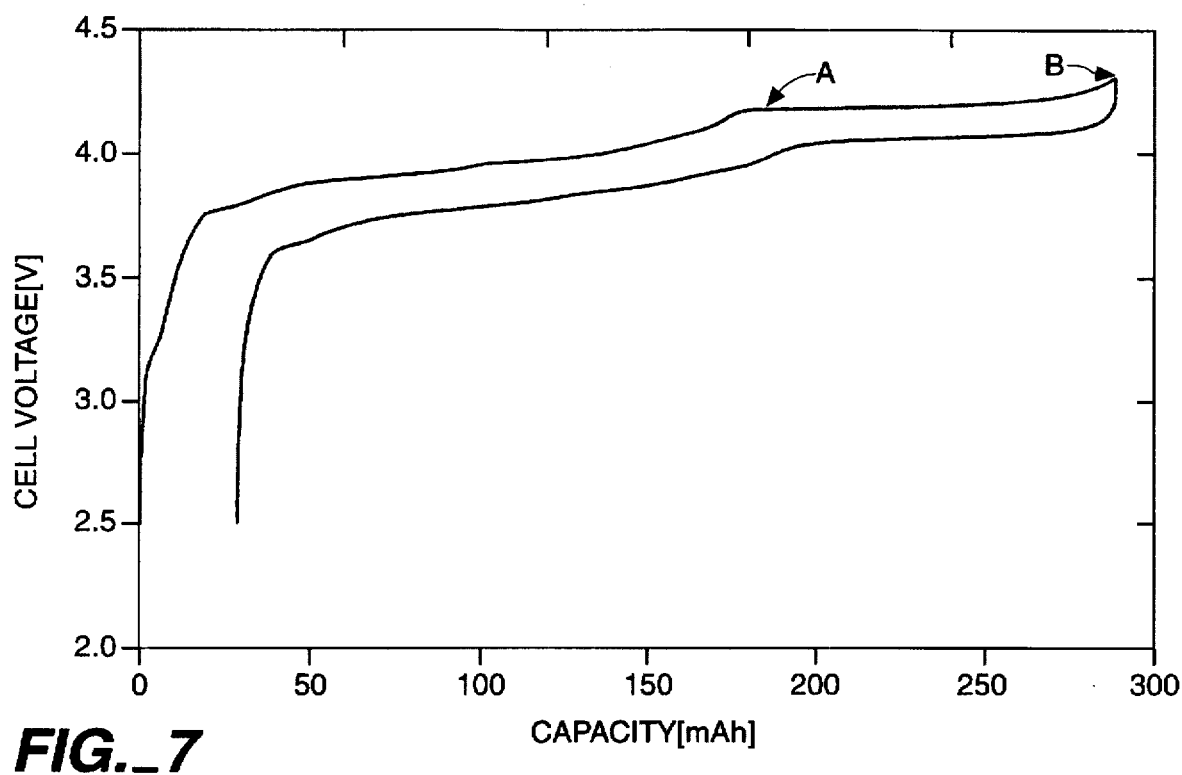
FIG._7
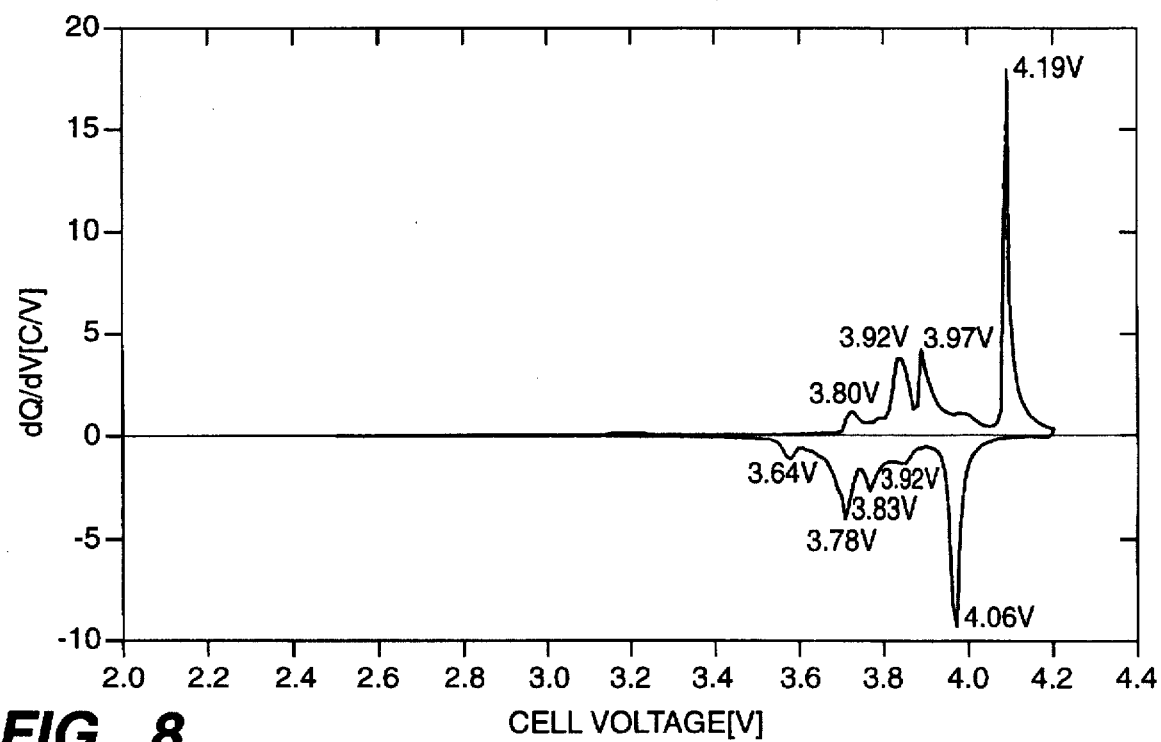
FIG._8

LITHIUM ION ELECTROCHEMICAL CELL

FIELD OF THE INVENTION

The present invention relates to electrochemical devices and, more particularly, to non-aqueous electrochemical cells demonstrating improved performance.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Graphite is a preferred carbon anode material because cells employing graphite anodes produce non-sloping voltage profiles and the voltage for insertion is close to that of lithium metal. Non-aqueous lithium electrochemical cells are discussed in U.S. Pat. Nos. 4,472,487, 4,668,595 and 5,028,500. The ratio of lithium to carbon in a carbon anode intercalation compound may vary over a broad range (e.g., $LiC_6$, $LiC_{12}$). However, it is best to combine the two in such a way as to form an intercalation compound with the highest possible Li:C ratio, that being $LiC_6$ for fully intercalated conventional graphite.

In operation, discharge of a lithium ion electrochemical cell is completed when either of two phenomena occurs:

(1) All the lithium in the carbon anode has been conducted across the electrolyte to the cathode; or (2) All the cathode active material in the cathode has been fully intercalated. Electrochemical cells operating under the first parameter are referred to as being anode capacity limited and those operating under the second are referred to as being cathode capacity limited. Since some lithium is lost from the system due to side reactions, conventional cells generally employ an excess of lithium.

In designing anodes and cathodes, the relative amounts of anodic and cathodic materials employed depend in part on the relative specific capacities of the anodic and cathodic materials. In a "balanced" cell or system that is neither cathode or anode limited the mass ratio of the cathodic material to anodic material is inversely proportional to the ratio of their specific capacities. For example, in the case of $LiMn_2O_4$, which has a relative molecular mass of 181, the specific capacity for this cathodic material is 148 mAh/g. This value is derived from the relationship that 181 g of $LiMn_2O_4$ produces approximately 96,500 coulomb (1 Faraday) (or 1 g yields about 533 coulomb), which corresponds to a theoretic specific capacity of 148 mAh/g. (This assumes that 1 lithium per formula unit of $LiMn_2O_4$ can be extracted.) Thus when using graphite which forms $Li_xC_6$ and which has a theoretical capacity of 372 mAh/g, as the anodic material, the theoretical mass ratio of $LiMn_2O_4$ to graphite is about 2.5:1 for a balance system. (This assumes that no lithium is lost due to irreversible cell reactions.)

In a conventional electrochemical cell, the actual specific capacities for the first discharge, that is, allowing for the first cycle loss, are typically about 105 mAh/g for $LiMn_2O_4$ (71% efficiency) and about 315 mAh/g for graphite (i.e., $Li_xC_6$) (85% efficiency). Thus the actual cathodic material to anodic material mass ratio is about 3:1 for this system.

SUMMARY OF THE INVENTION

The present invention is based in part on the discovery of a graphite material that can be employed as the intercalation carbon material (i.e., anodic material) in electrochemical devices. Electrochemical cells employing this graphite material demonstrate significantly higher than expected anode capacities. As a result, a very high cathodic material to anodic material mass balance can be used to produce cells demonstrating exceptional energy densities.

In one aspect, the invention is directed to an electrochemical cell comprising:

an anode comprising an anode active material comprising graphitized microbead carbon particles;

a cathode comprising a cathode active material, wherein the amount of cathode active material present is sufficient to intercalate into the anode active material to attain an effective anode specific capacity of at least 372 mAh/g; and an electrolyte containing an electrolyte solution that is interposed between the anode and cathode.

In another aspect, the invention is directed to a method of fabricating an electrochemical cell comprising the steps of:

(a) providing an anode comprising an anode active material comprising graphitized microbead carbon particles;

(b) providing a cathode comprising a cathode active material that is present in sufficient amounts to intercalate into the anode active material to attain an effective anode specific capacity of at least 372 mAh/g; and (c) forming an electrolyte containing an electrolyte solution that is interposed between said anode and said cathode.

In yet another aspect, the invention is directed to a method of fabricating an electrochemical cell comprising the steps of:

(a) providing an anode comprising an anode active material comprising graphitized microbead carbon particles, wherein said anode active material has an effective specific capacity x;

(b) providing a cathode comprising a cathode active material which has an effective specific capacity y that ranges from about 90 mAh/g to about 150 mAh/g, wherein the mass ratio of said cathode active material to said anode active material is equal to or greater than the ratio of x to y, and wherein the amount of cathode active material present is sufficient to intercalate into the active material to attain an effective anode specific capacity of at least 372 mAh/g; and (c) forming an electrolyte containing an electrolyte solution that is interposed between the anode and the cathode.

In a preferred embodiment, the anode active material is a mixture comprising graphitized microbead carbon particles and graphite platelet particles.

Important features of the invention are that: (1) the anodic active material has a very high specific capacity, (2) the electrochemical cell is expected to have a cycle life of greater than 200 cycles, and (3) the electrochemical cell has a first cycle capacity loss of only about 10% to 15%, where the first cycle capacity loss (%) =

$$\frac{(\text{first cycle charge capacity} - \text{first cycle discharge capacity}) \times 100\%}{\text{first cycle charge capacity}}$$

BRIEF DESCRIPTION OF THE DRAWINGS

FIGS. 1, 4, 6 and 8 display the differential capacity during cell charge and discharge vs. cell voltage for electrochemical cells.

FIGS. 2, 3, 5 and 7 display the cell voltage vs. capacity over a complete charge/discharge cycle for electrochemical cells.

DETAILED DESCRIPTION OF THE PREFERRED EMBODIMENTS OF THE INVENTION

The present invention is based in part on the discovery that graphitized microbead carbon particles when used as intercalation material produce anodes having an effective specific anodic capacity of greater than 372 mAh/g, preferably higher than 400 mAh/g. As a corollary an important aspect of the invention is that significantly higher cathodic material to anodic material mass ratios can be employed in fabricating electrochemical cells than previously realized. It has been demonstrated that when sufficient cathode active material is employed the graphitized microbead carbon particles can attain effective specific capacities of about 565 mAh/g.

Anodes of the present invention can be employed in rechargeable electrochemical devices, particularly solid electrochemical cells and batteries, that include: a cathode, an intercalation based carbon anode comprising graphitized microbead carbon particles, with each electrode capable of reversibly incorporating (e.g., intercalating) an alkali metal ion, and a polymeric matrix containing an organic solvent and a salt of the alkali metal. Particularly preferred electrochemical cells and batteries use lithium and salts thereof. Although solid electrochemical cells are preferred, the invention is also applicable to liquid electrochemical cells wherein the electrolyte comprises a separator (e.g., glass fiber, polyethylene or polypropylene) and an electrolyte solution.

The anode of the present invention generally comprises an anode film that is laminated onto one or both sides of the current collector which is a thin metal foil or grid. Typically, each anode film is from about 100 μm to about 250 μm in thickness, preferably about 110 μm to about 200 μm, and more preferably about 125 μm to about 175 μm.

Similarly, the cathode of the present invention generally comprises a cathode film that is laminated onto one or both sides of the cathode current collector which is a thin metal foil or grid. Typically, each cathode film is from about 100 μm to about 200 μm in thickness, preferably about 130 μm to about 175 μm, and more preferably about 140 μm to about 165 μm.

Current collector for the anode and cathode can comprise, for example, a screen, grid, expanded metal, woven or non-woven or knitted wire fabric formed from an electron conductive material such as metals or alloys. Preferably, the current collector has a thickness from about 25 μm to about 75 μm, preferably about 35 μm to about 65 μm, and more preferably about 45 μm to about 55 μm. Each current collector is also connected to a current collector tab which extends from the edge of the current collector. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability liquid solvents (e.g., diethyl ether) or by supercritical fluids for example. Preferred plasticizers include, for example, dibutyl phthalate, dioctylphthalate, and acetates, glymes, and low molecular weight polymers.

In operation, for fabricating a solid polymeric matrix and composite electrode that includes polymeric binders, for example, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and solid polymeric matrix. The anode and/or cathode may each include a current collector. For a liquid electrolytic cell, a separator made of any suitable material such as, for example, glass fiber, polyethylene, or polypropylene is employed instead of a solid polymeric matrix.

The term "activation" refers to the placement of an electrolyte solution into the porous portions of an electrochemical cell precursor. After activation, the electrochemical cell is charged by an external energy source prior to use.

The term "electrolytic cell" or "electrochemical cell" refers to a composite containing an anode, a cathode and an ion-conducting electrolyte interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. The solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluroide and hexafluoropropylene dissolved in acetone or other suitable solvent(s). Upon casting the solution, the solvent is evaporated to form the solid polymeric matrix. The solution may be casted directly onto a current collector. Alternatively, the solution is casted onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, may be added in the electrolyte to reduce the level of irreversible reactions.

For electrochemical cells where (1) the cathodic material comprises lithiated cobalt oxides, lithiated manganese oxides, lithiated nickel oxides, $Li_xNi_{1-y}CO_yO_2$, where x is preferably about 1 and y is preferably 0.1–0.9, $LiNiVO_4$, or $LiCoVO_4$, and (2) the anodic material comprises graphite, the electrolytic solvent preferably comprises a mixture of ethylene carbonate and dimethyl carbonate.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethyl-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode includes an anodic material (or anode active material) which is capable of reversibly incorporating (e.g., intercalating) lithium ions. The anodic material can consist essentially of the graphitized microbead carbon particles described herein. Alternatively, the anodic material can be a mixture comprising the graphitized microbead carbon particles and other anodic materials. Such other compatible anodic materials are well known in the art and include, by way of example, other carbon materials such as graphite, cokes, mesocarbons, and the like, that are capable of reversibly incorporating lithium ions. Anodic material mixtures most preferably include graphite. Preferably, the anode active material does not include amorphous (or nongraphite) carbon materials. Examples of non-graphitic materials include, for example, mesocarbons that have been heat treated below about 2400° C., petroleum cokes, and disordered carbons. Preferably, the anodic material comprises about 25% (wt) to about 100% (wt), and more preferably about 45% (wt) to about 100% (wt) of said graphitized microbead carbon particles.

The anode preferably includes a polymeric binder and extractable plasticizer suitable for forming a bound porous composite having a molecular weight of from about 1,000 to 5,000,000. Examples of suitable polymeric binders include EPDM (ethylene propylene diene termonomer), PVDF (polyvinylidene difluoride), EAA (ethylene acrylic acid copolymer), EVA (ethylene vinyl acetate copolymer), EAA/EVA copolymers, copolymers of polyvinylidenedifluoride (PVDF) and hexafluoropropylene (HFP) and the like. The anode may also include an electron conducting material such as carbon black.

Graphitized microbead carbon particles of the present invention generally have a spherical structure that allows for a close-packed arrangement, resulting in high density and low surface area compositions. A preferred graphitized microbead carbon composition comprises particles having a size distribution wherein essentially all of the particles are less than 40 μm in size, and preferably wherein at least 50% (wt) of the particles are less than 25 μm, and more preferably wherein at least about 94% of the particles are of less than 16 μm in size, and wherein $d_{50}$ is about 8.1 μm. $d_{50}$ is defined as the median size of the particles.

Preferred graphitized microbead particles comprise heat-treated mesocarbon microbeads (MCMB). Graphitization of the MCMB occurs, for example, under heat treatment at about 2800° C. or higher (preferably between 2800° C. to 3000° C.) in argon atmosphere after carbonization at 1000° C. at 2.5° C./min. with soak time of 1 h under nitrogen atmosphere. Heat treated MCMBs are described generally in Mabuchi et. al., J.Electrochem. Soc. Vol. 142, No. 9, 3049-51, which is incorporated herein. A suitable heat-treated microbead mesocarbon having a diameter of approximately 25 μm and heat treated at 2800° C. is available under the designation MCMB 25-28™ from Osaka Gas Co., Japan. Preferred MCMBs have a crystallite height $L_c$ (i.e., coherence lenght) of about 46 nm, an interlayer distance $d_{002}$ of about 3.37 Å, and a specific gravity of about 2.18 g/cm³. As demonstrated herein, for electrochemical cells of the present invention, the anode comprises anodic materials that have effective or actual specific capacities of greater than 372 mAh/g. It has been demonstrated that anodic materials comprising a mixture of 50% MCMB and 50% graphite in the form of platelet particles have an effective specific capacity of about 565 mAh/g. It is believed that the graphitized microbead carbon particles improves the overall effective capacity of the anodic material mixture so that the effective capacity of the mixture is higher than the weighted average of the effective specific capacities of the MCMB and the graphite for any particular mixture. Nevertheless, it is expected that higher effective capacities can be attained by increasing the percentage of graphitzed microbead particles in an anodic mixture.

Anodic materials comprising a mixture of the graphitzed microbead carbon particles and another carbon anodic material can achieve an effective specific capacity of greater than 372 mAh/g and preferably from about 400 mAh/g to about 565 mAh/g and higher. By carefully selecting the percentage of graphitzed microbead particles in an anodic mixture, one can prepare an anodic mixture having a defined effective specific capacity. Most preferably, the other carbon anodic materials of the mixture are highly ordered, crystalline carbons such as graphite. It is expected that an effective specific capacity of about 850 mAh/g can be attained. Anodic material mixtures can comprises about 10% to about 90%, preferably 20% to about 80%, and more preferably about 30% to about 70% of the graphitized microbead carbon particles.

When the anodic material comprises a mixture of said graphitized microbead carbon particles and another carbon anodic material, the latter preferably comprises graphite in the form of platelet particles preferably have an aspect ratio of about 5:1 and preferably of about 10:1. Suitable platelet particles have lengths preferably ranging from about 4 μm to 50 μm, and more preferably from about 7 μm to 25 μm and have thicknesses ranging from about 0.8 μm to 10 μm, and more preferably from about 1.4 μm to 2 μm. Preferred platelet particles have lengths of about 15 μm and thicknesses of about 1.5 μm.

A preferred carbon platelet composition comprises graphite particles with a size distribution wherein essentially all of the graphite particles are less than 48 μm in size, and preferably wherein at least 90% (wt) of the particles are less than 16 μm, and more preferably wherein at least about 94% of the particles are of less than 16 μm in size, and wherein $d_{50}$ is about 8.1 μm. The crystillinity of the graphite is such that the crystallite height L, (i.e., coherence length) is at least 100 nm and preferably greater than 120 nm and the interlayer distance $d_{002}$ is about 3.354 Å to 3.358 Å and more preferably about 3.355 Å. The density of the graphite particles is preferably about 2.25 to about 2.265, more preferably about 2.26 g/cm$^3$. The specific surface area of the graphite, as determined by the Brunauer-Emmett-Teller or "BET" method, is preferably about 6 to about 12, and more preferably is about 8.8 m$^2$/g. The graphite contains less than about 0.15% (wt) ash, more preferably less than about 0.1%. Most preferably the graphite is anisotropic, which means that its fundamental physical properties (e.g., electronic resistivity) varies with direction. Platelet-type graphite having the above physical characteristics and suitable for use as a secondary carbon material is a synthetic graphite available under the designation SFG-15™ from Lonza G & T, Ltd. (Sins, Switzerland). This particular graphite has high anisotropy similar to natural graphite so that it has good compressibility and high electrical conductivity.

Anodes wherein the anodic material comprises a mixture of said graphitized microbead carbon particles and SFG-15™ have demonstrated superior structural integrity. The anodes remain intact during the life of the electrochemical cell. A preferred mixture of anodic material comprises 10 to 90% (wt) SFG-15™ and 10 to 90% (wt) of the graphitized microbead carbon material, more preferably 20 to 80% (wt) SFG-15™ and 20 to 80% (wt) of the graphitized microbead carbon particles, and most preferably 30 to 70% (wt) SFG-15™ and 30 to 70% (wt) of the graphitized microbead carbon particles. The specific capacity of the carbon platelet composition is comparable to that of conventional graphite.

The cathode typically comprises a cathodic material or cathode active material (i.e., insertion compound) which is any material which functions as a positive pole in a solid electrolytic cell. Such cathodic materials are well known in the art and include, by way of example, transition metal oxides, sulfides, and selenides, including lithiated compounds thereof. Representative cathodic materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq 2$. Blends can also include $Li_y$-α-$MnO_2$ ($0\leq y<1$) which has a hollandite-type structure. $Li_y$-α-$MnO_2$ where $0\leq y<0.5$ is preferred. α$MnO_2$ can be synthesized by precipitation from a reaction between a $MnSO_4$ solution and $(NH_4)_2S_2O_8$ as an oxidizing agent.

Lithiation (also referred to as "prelithiation") of α$MnO_2$ can be accomplished via a solid state reaction:

$NH_4Mn_8O_{16}+LiOH \rightarrow LiMnO_2$ (400° C.).

Li-α-$MnO_2$ retains the same structure as Hollandite. See, Botkovitz et. al., J. of Power Sources, 43–44 (1993) 657–665, which is incorporated herein, for a discussion of the structure and electrochemical characteristics of Li-α-$MnO_2$. $Li_y$-α-$MnO_2$ $0<y\leq 0.5$ is commercially available from SEDEMA, Tertre, Belgium.

In one preferred embodiment, the cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, copolymers of PVDF and HFP, and the like; from about 0 to about 20 weight percent of polyethylene oxide having a number average molecular weight of at least 100,000; from about 10 to 50 weight percent of electrolyte solvent; and from about 5 weight percent to about 25 weight of a solid matrix forming monomer or partial polymer thereof. Also included is an ion conducting amount of an inorganic ion salt. Generally, the amount of the salt is from about 1 to about 25 weight percent. (All weight percents are based on the total weight of the cathode.)

For electrochemical cells of the present invention, the cathode preferably comprises cathodic materials that have an effective or actual specific capacities of about 90 to about 150 more preferably about 100 to about 140 mAh/g. A preferred cathodic material is $LiMn_2O_4$. It is understood however, that any cathode active material can be employed.

A critical aspect of the present invention is that in fabricating electrochemical cells and batteries, the ratio of cathodic material to anodic material employed is considerably higher than that used in the prior art where the anodic material comprised of conventional graphite which have theoretical and effective specific capacities of only 372 and 315 mAh/g, respectively. The motivation to use a much higher proportion of cathodic material is based on the discovery that the inventive graphitized microbead carbon particles have extremely high specific capacities relative to conventional graphite. From a practical standpoint, with the invention one may employ the same type and amount of cathodic material as in conventional cathodes but employ less of the inventive graphitized microbead carbon particles (relative to conventional graphite) in the anode to fabricate an electrochemical cell. This electrochemical has a higher energy density and capacity.

For cathodes and anodes of electrochemical cells of the present invention, the cathode active material to anode active material mass ratio is such that there is sufficient cathode active material to intercalate the anode active material to attain an effective anode specific capacity of at least 372 mAh/g. The actual mass ratio will depend on the cathode active material(s) used. For example, in the case of $LiMn_2O_4$ cathodic material to anodic material mass ratio is preferably about 4 (or more) to 1, whereas in the case of $LiNiO_2$ or $LiCoO_2$ the ratio is preferably about 3 (or more) to 1. It is expected that for about 3 (or more) to 1. It is expected that for $LiMn_2O_4$ ratio can be as high as about 7.5:1 and still be an anode limited system.

The mass ratio is calculated on the basis of the effective or actual specific capacities of the cathodic and anodic materials used. By "effective or actual specific capacity" is meant the specific capacity of anode active material or the cathode active material as the case may be, as measured after the initial discharge/charge cycle of the electrochemical cell. For $LiMn_2O_4$, the effective specific capacity is about 105 mAh/g. Given that $LiMn_2O_4$ has a theoretic capacity of about 148 mAh/g, its efficiency as a cathodic material is about 71%. The efficiency of cathodic materials will vary depending on the electrochemical cell components and operating conditions. Thus, when the efficiency is high less cathodic materials will be needed to intercalate the anodic materials. Similarly, for both $LiCoO_2$ and $LiNiO_2$, the theoretical and effective capacities and the efficiency are approximately: 274 mAh/g, 137 mAh/g, and 50%, respectively. (Note that the molecular weights of $LiCoO_2$ and $LiNiO_2$ are about the same.)

The inventive graphitzed microbead carbon particles have effective specific capacities 565 mAh/g or higher. It is expected that the effective specific capacity may be as high as about 850 mAh/g. In comparison, conventional graphite, which forms $Li_xC_6$ upon intercalation, has theoretical and effective specific capacities of 372 mAh/g and 315 mAh/g, respectively, for an efficiency of about 85%.

With the present invention, the amount of cathode active material(s) employed will depend on the type and amount of anodic material(s) used and the other components of the cell and its operating conditions. For instance, if the anode active material consists essentially of the graphitzed microbead carbon particles, preferably more cathode active material is employed than if the anode active material comprised a mixture of graphitized microbead carbon particles and platelet particles since the mixture will have a lower specific capacity.

Once the compositions of the anode active material and cathode active materials are selected, the relative amount of each to be employed is inversely proportional to the ratio of their effective specific capacities. As an illustration, if $LiMn_2O_4$ is to be employed as the cathodic material and the anodic material is a mixture comprising the graphitized microbead carbon particles wherein the mixture has an effective capacity of 565 mAh/g, then the mass ratio of cathode to anode active material for a "balanced" system is about 5.4 to 1. This is derived from the ratio of the effective specific capacities for the anodic material (565 mAh/g) and cathodic material (105 mAh/g). For the present invention, electrochemical cells that are anode limited are preferred so that for this example the mass ratio may be 5.4 to 1.

In another aspect of the invention, because the anode employs graphitzed anodic materials which have a highly ordered structure (as opposed to non-graphitized mesocarbon or coke), electrochemical cells exhibit a generally non-sloping voltage profile having a well defined voltage plateau below 0.25 volts versus a lithium reference.

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

METHODOLOGY

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The graphitized microbead carbon particles can be employed to form anode structures for prior art electrochemical cells. The following illustrates a method of how an electrolytic cell could be fabricated with using the inventive carbon mixture. Examples 1 and 2 describe the process of preparing the anode and cathode, respectively. Example 3 describes the procedures for fabricating a solid electrolytic cell. In this "baseline" electrochemical cell, the cathodic material to anodic material mass ratio is 3.09 to 1.

The anodic material comprises a mixture having 50% (wt) of the graphitized microbead carbon particles (i.e., MCMB25-28™) and 50% (wt) of the carbon platelet particles (i.e., SFG-15™). The cathodic material comprises $LiMn_2O_4$.

The invention will be described using the anode and cathode structures wherein electrode materials (or films) are laminated onto both sides of the current collectors, however, it is understood that the invention is applicable to other configurations, for example, where one side of the anode and/or cathode current collector is laminated.

EXAMPLE 1

The anode current collector employed was a sheet of expanded copper metal that is about 50 μm thick. It is available under the designation 2Cu5-125 (flatten) from Delker Corp., Branford, Conn. The anode slurry was prepared as follows:

A polymer mixture comprising a copolymer of polyvinylidenedifluoride (PVDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-0417200. The copolymer functions as a binder for the carbon in the anode.

A graphite mixture was prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P' from M.M.M. Carbon, Willebrock, Belgium. The graphite mixture was then vigorously mixed in a high shear mixer until a substantially homogeneous blend was formed. A suitable mixer is available from Ross Model ME100DLX, Hauppauge, New York, operating at its highest setting (about 10,000 RPM) for 30 minutes. (Optionally, about 0.5 grams of a surfactant can be added to the graphite mixture to facilitate dispersion of the graphite. Preferred surfactants include Pluronic FC68PM from BASF, Mt. Olive, N.J. and Flurad 430™ from 3M Co. St. Paul, Minn.)

The anode slurry was prepared by mixing the polymer mixture and the graphite mixture together under low shear conditions to form the anode slurry wherein the components are well mixed. A portion of the acetone is allowed to evaporate from the slurry before it was laminated onto each side of the current collector. Anode films form when the remaining portion of the acetone evaporates.

EXAMPLE 2

The cathode current collector employed was a sheet of expanded aluminum that is about 50 μm thick. The aluminum grid is available under the designation 2AL5-077 from Delker Corp. The cathode slurry was prepared as follows:

A polymer mixture comprising a copolymer of polyvinylidenedifluoride (PVDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by mixing 28.9 grams of $LiMn_2O_4$, 2.4 grams of carbon black (Super P™) into a solution containing 60 grams acetone, and 8.7 grams dibutyl phthalate. The mixture was then vigorously mixed in the a high shear mixer until a substantially homogeneous blend was formed. As further described below, the amount of cathode-active material $LiMn_2O_4$ employed can be varied to provide different cathode to anode mass ratios.

The cathode slurry was prepared by mixing the polymer mixture and the cathode mixture together under low shear conditions to form the cathode slurry wherein the components are well mixed. A portion of the acetone is allowed to evaporate from the slurry before it was laminated onto each side of the current collector. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the current collector.

EXAMPLE 3

A solid electrochemical cell is prepared by first positioning a polymeric matrix between the anode and cathode and thereafter fusing the structures under moderate pressure and temperature (e.g., 130° C.) to form an electrochemical cell precursor. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $$\frac{M_n}{M_w} \simeq 1.0.$$

Next the dibutyl phthalate plasticizer is extracted from the precursor. Extraction can be accomplished using conventional organic liquid solvents such as diethyl ether or by a dense fluid or gas which refers to a gas compressed and heated to either supercritical or subcritical conditions to achieve liquid-like densities. Dense gases and fluids are known in the art. See, for example, U.S. Pat. Nos. 5,013,366, 5,267,455, 4,219,333, 4,012,194, and 3,969,196, which are incorporated herein. A preferred dense gas is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

EXPERIMENTAL

Performance of Electrochemical Cells

Electrochemical cells employing various anodic materials were tested by Electrochemical Voltage Spectroscopy (EVS). EVS is a known technique that is described, for example, in Barker, *Electrochimica Acta*, Vol. 40, No. 11 pp 1603–1608, 1995, which is incorporated herein.

For the electrochemical cells of FIGS. 3–8, the cells were prepared generally in accordance with Examples 1–3. Specifically, PVDF-HFP copolymer binder was used in the anode. The cathode comprised $LiMn_2O_4$ and PVDF-HFP copolymer as the binder. The electrolyte comprised the separator described in Example 3 together with a mixture of ethylene carbonate (EC) and dimethyl carbonate (DMC) (67:33 ratio by weight) and 1M $LiPF_6$. The electrodes and separator of the electrochemical cells each had a surface area of approximately 48 cm².

For the electrochemical cells of FIGS. 1 and 2, the anode was prepared in accordance with Example 1, the counter electrode was lithium foil (50 μm thick), and the liquid electrolyte comprised glass fiber with a mixture of EC/DMC (67:33) and 1M $LiPF_6$. The electrodes and electrolyte each had a surface area of approximately 24 cm².

FIG. 1 displays the differential capacity vs. cell voltage during the second cell charge and discharge cycle for a half cell wherein the anode active material consisted essentially of graphitized microbead particles available as MCMB 25-28™. The counter electrode comprised lithium metal. The measured reversible specific capacity of the anodic material was more than 420 mAh/g. Peaks 1, 2, and 3 are characteristic of normal graphite intercalation sites whereas peak 4 represents an additional site when graphitized microbead particles are used in the anode of the inventive electrochemical cell. If this additional peak were due to lithium plating on the carbon surface and/or on the current collector it would be expected to be present at, or below the lithium deposition potential (i.e. OV vs. Li/Li$^+$). In addition the coulombic reversibility for the cycle would be expected to be poor due to interaction between the plated lithium and the electrolyte.

In conventional electrochemical cells wherein graphite (having a theoretical specific capacity of 372 mAh/g) is employed as the intercalation anode material, only peaks 1,2, and 3 would be present when the differential capacity vs. cell voltage during cell charge and discharge is plotted. See, e.g., Megahed & Scrosati, J. Power Sources, 51 (1994) 74–104. (FIG. 1A and 1B therein.) However, as evidenced by FIG. 1, when the inventive graphitized microbead particles are employed as the anodic material, peak 4 will also be present in such as graph, provided that the cathodic to anodic materials mass ratio is high enough to take advantage of the higher specific capacity of the anodic material. Note that the coulombic efficiency of this cycle shown in FIG. 1 (i.e., insertion/ extraction efficiency) is near 100%. Thus although only 3 peaks are present on the extraction part, the lithium inserted at peak 4 is removable.

FIG. 2 displays the complementary cell voltage profile for the second charge and discharge cycle for the same cell as FIG. 1. As is apparent, the graph indicates that the insertion and extraction of lithium ion into and out of the anodic material is substantially completely reversible.

FIG. 3 displays the cell voltage profile during the first cycle cell charge (upper curve) and discharge (lower curve) for an electrochemical cell wherein the anode active material comprised 50% MCMB25-28™ and 50% SFG-15™ and the cathodic to anodic materials mass ratio was 3.09:1. The effective specific capacities of the cathodic and anodic materials were 113 mAh/g and 348 mAh/g, respectively. FIG. 4 gives the corresponding and complementary differential capacity plot for the cell of FIG. 3. The upper curve is for cell charge and the lower curve is for cell discharge. The cell was cycled between voltage limits of 2.5 and 4.3 V. Both plots evidence conventional graphite intercalation.

FIG. 5 displays the cell voltage profile during the first cycle cell charge (upper curve) and discharge (lower curve) for an electrochemical cell wherein the anode active material comprised 50% MCMB 25-28™ and 50% SFG-15™ but the cathodic to anodic materials mass ratio was 3.77:1. The effective specific capacities of the cathodic and anodic materials were 116 mAh/g and 437 InAh/g, respectively. As is apparent, the anodic material utilization is considerably higher in this cell than that of the cell represented by FIGS. 3 and 4. As compared to the electrochemical cell of FIG. 3, the electrochemical cell of FIG. 5 has an additional site of lithium ion intercalation as evidenced by the plateau 10 on the curve situated at a capacity of about 220 mAh to about 260 mAh. FIG. 6 gives the corresponding and complementary differential capacity plot for the cell which shows peaks 1A and 1B that are characteristic of the additional site. These peaks are not present in FIG. 4.

FIG. 7 displays the cell voltage profile during first cell charge (upper curve) and discharge (lower curve) for an electrochemical cell wherein the anode active material comprised 50% MCMB 25-28™ and 50% SFG-15" and the cathodic to anodic materials mass ratio was 5.0:1. The effective specific capacities of the cathodic and anodic materials were 113 mAh/g and 565 mAh/g, respectively. The charge capacity is 288.6 mAh and the discharge capacity is 259.4 mAh for a first cycle capacity loss of 29.2 mAh or 10.1%. (In contract, if coke were employed as the anode active material, the first cycle capacity loss would be about 25%–40%.) As is apparent, the anodic material utilization is considerably higher in this cell than that of the cell represented by FIGS. 3 and 4. The plateau, defined approximately by points A and B, represents an additional reversible site of lithium ion intercalation. FIG. 8 gives the corresponding and complementary differential capacity plot for the cell which shows an additional peak at 4.19 V which is characteristic of the additional site. If this addition reversible site were due to some plating/stripping reaction a substantially higher first higher cycle loss would be apparent since the plated, high surface lithium would be expected to chemically react with the electrolyte solvent.

It was also demonstrated that the electrochemical cells corresponding to FIGS. 5–8 were very reversible following the first cell cycle. Specifically, the cells were cycled more than 100 times without appreciable capacity loss (i.e., about 10%–20% of the original capacity).

Depending on the cathodic to anodic materials mass ratio, lithium ion electrochemical cells employing the graphitized microbead carbon particles can achieve an effective specific anode capacity of greater than about 372 mAh/g to about 400 mAh/g, more preferably from about 500 mAh/g to about 565 mAh/g and higher. It is understood that as the electrochemical cell undergoes multiple cycles, the effective specific anode capacity gradually decreases from its initial value of greater than about 372 mAh/g due to the inevitable discharge capacity fade of the cell. In addition the cell will have a first cycle capacity loss of less that about loss of less than about 20% and preferably between about 10% and about 15%. Finally, the inventive lithium electrochemical cells should have a cycle life at greater than 200 cycles, and more preferably between about 500 to about 2,000 cycles. Cycle life is measured as the number of cycles required before an electrochemical cell has lost 50% of its original discharge capacity.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. An electrochemical cell comprising:

an anode comprising an anode active material comprising graphitized microbead carbon particles;

a cathode comprising a cathode active material wherein the amount of cathode active material present is sufficient to intercalate the anode active material to attain an effective anode specific capacity of greater than 372 mAh/g; and an electrolyte containing an electrolyte solution that is interposed between the anode and cathode.

2. The electrochemical cell of claim 1 wherein the cathode active material is LiMn$_2$O$_4$ and the mass ratio of said cathode active material to said anode active material is from about 4 to 1 to about 5 or more to 1.

3. The electrochemical cell of claim 1 wherein the cathode active material is $LiCoO_2$ or $LiNiO_2$ and the mass ratio of said cathode active material to said anode active material is 3 or more to 1.

4. The electrochemical cell of claim 1 wherein said anode active material is a mixture comprising graphitized microbead carbon particles and graphite.

5. The electrochemical cell of claim 4 wherein said graphite comprises carbon platelet particles and wherein said graphitized microbead carbon particles comprises about 30% (wt) to about 70% (wt) of said mixture.

6. The electrochemical cell of claim 4 wherein said graphite comprises graphite platelet particles.

7. The electrochemical cell of claim 5 wherein said anode active material has an effective specific capacity of about 400 to about 565 mAh/g, and wherein the mass ratio of said cathode active material to said anode active material is about 4 to 1 to about 5 (or more) to 1.

8. The electrochemical cell of claim 1 wherein the graphitized microbead carbon particles comprise heat-treated mesocarbon microbeads that have been heat treated at about 2800° C. to about 3000° C.

9. The electrochemical cell of claim 1 wherein said electrochemical cell has a first cycle capacity loss of less than about 15%.

10. The electrochemical cell of claim 1 wherein the cell is anode limited.

11. The electrochemical cell of claim 1 wherein said cathode active material comprises $LiMn_2O_4$ and the mass ratio of cathode active material to anode active material is about 5.4 or more to 1.

12. The electrochemical cell of claim 2 wherein said anode active material is a mixture comprising graphitized microbead carbon particles and graphite.

13. The electrochemical cell of claim 12 wherein said graphite comprises carbon platelet particles and wherein said graphitized microbead carbon particles comprises about 30% (wt) to about 70% (wt) of said mixture.

14. The electrochemical cell of claim 12 wherein said graphite comprises graphite platelet particles.

15. The electrochemical cell of claim 13 wherein said anode active material has an effective specific capacity of about 400 to about 565 mAh/g, and wherein the mass ratio of said cathode active material to said anode active material is about 4 to 1 to about 5 (or more) to 1.

16. The electrochemical cell of claim 2 wherein the graphitized microbead carbon particles comprise heat-treated mesocarbon microbeads that have been heat treated at about 2800° C. to about 3000° C.

17. The electrochemical cell of claim 2 wherein said electrochemical cell has a first cycle capacity loss of less than about 15%.

18. The electrochemical cell of claim 2 wherein the cell is anode limited.

19. The electrochemical cell of claim 2 wherein the mass ratio of cathode active material to anode active material is about 5.4 or more to 1.

20. The electrochemical cell of claim 1 wherein the effective anode specific capacity is greater than about 400 mAh/g.

21. The electrochemical cell of claim 2 wherein the effective anode specific capacity is greater than about 400 mAh/g.

22. The electrochemical cell of claim 1 wherein the effective anode specific capacity is greater than about 565 mAh/g.

23. The electrochemical cell of claim 2 wherein the effective anode specific capacity is greater than about 565 mAh/g.

24. The electrochemical cell of claim 6 wherein the graphite platelet particles have an aspect ratio between 5:1 to 10:1.

25. The electrochemical cell of claim 14 wherein the graphite platelet particles have an aspect ratio between 5:1 to 10:1.

* * * * *